US00RE34285E

United States Patent [19]

Olson et al.

[11] E Patent Number: Re. 34,285

[45] Reissued Date of Patent: Jun. 15, 1993

[54] AUTOMATIC TRIM SYSTEM

[75] Inventors: Jeffrey A. Olson, Mundelein; M. Jeremy Lieb, Northbrook, both of Ill.

[73] Assignee: Outboard Marine Corporation, Waukegan, Ill.

[21] Appl. No.: 452,559

[22] Filed: Dec. 18, 1989

Related U.S. Patent Documents

Reissue of:

[64] Patent No.: 4,718,872
Issued: Jan. 12, 1988
Appl. No.: 773,591
Filed: Sep. 9, 1985

[51] Int. Cl.[5] ..... B63H 21/22

[52] U.S. Cl. ..... 440/1; 440/53

[58] Field of Search ..... 440/1, 2, 900, 61-63, 440/53, 84-87; 114/274-277; 364/424, 442; 318/588

[56] References Cited

U.S. PATENT DOCUMENTS

| | | | |
|---|---|---|---|
| 3,314,391 | 4/1967 | Duport | 115/16 |
| 3,468,282 | 9/1969 | Wintercorn | 440/1 |
| 3,834,345 | 9/1974 | Hager et al. | 115/41 |
| 3,894,250 | 7/1975 | Hager et al. | 307/309 |
| 4,051,801 | 10/1977 | Woodfill et al. | 115/12 |
| 4,058,711 | 11/1977 | Onderain | 364/157 |
| 4,318,699 | 3/1982 | Wenstadt et al. | 440/1 |
| 4,349,868 | 9/1982 | Brown | 364/157 |
| 4,494,183 | 1/1985 | Bayer | 364/154 |
| 4,565,528 | 1/1986 | Nakase | 440/1 |

*Primary Examiner*—Edwin L. Swinehart
*Attorney, Agent, or Firm*—Michael, Best & Friedrich

[57] ABSTRACT

A control for adjusting the trim of a motor boat having a drive unit mounted on the boat for adjustment of the thrust angle relative to the boat. A trim motor adjusts the drive unit relative to the boat. A boat speed responsive pick up and control provides an output signal indicative of boat speed. A microprocessor controls the trim motor and is connected to receive the speed signals. The microprocessor reads boat speed at intervals and compares the latest speed reading with the prior reading to determine whether boat speed is increasing. The microprocessor commands the trim motor to move the drive unit in increments in one direction so long as each adjustment results in increasing speed and then to move the trim motor to adjust the drive unit in increments in the opposite direction so long as the adjustment results in increasing speed. The microprocessor hunts for optimum adjustment by adjusting the drive unit in both directions until boat speed has been maximized, or nearly so, and then stops adjusting the drive unit. The microprocessor delays hunting for maximum boat speed until boat speed is constant following activation of the control. There is a time delay following each adjustment of the drive unit before present boat speed is determined for comparison with the prior speed reading.

17 Claims, 2 Drawing Sheets

AUTOMATIC TRIM SYSTEM

Matter enclosed in heavy brackets [ ] appears in the original patent but forms no part of this reissue specification; matter printed in italics indicates the additions made by reissue.

BACKGROUND OF THE INVENTION

This invention relates to trim control of the drive unit on a boat. The basic approach is manual control of the hydraulic motor which adjusts the hydraulic cylinders which adjust the drive unit "in" or "out". There have been proposals for automatic adjustment of the trim angle. These proposals are rather complex in that they take many factors into consideration.

Attention is directed in the following U.S. Pat. Nos.: 3,314,391, 3,834,345, 3,894,250, 4,051,801 and 4,318,699.

SUMMARY OF THE INVENTION

The invention provides apparatus for trimming a drive unit on a boat, which apparatus comprises means for sensing an increase in boat speed, means for changing the trim of the drive unit, and control means connected to the sensing means, and to the trim changing means for changing the trim of the drive unit until the sensing means senses the absence of boat speed increase.

The invention also provides a control for adjusting the trim of a marine drive unit, which control comprises a drive unit adapted to be adjustably mounted on the boat for adjustment of the drive unit thrust angle relative to the boat, trim drive means for adjusting the drive unit relative to the boat, boat speed responsive means providing an output signal indicative of boat speed, control means operative to control the trim drive means and connected to receive the output signal, which control means is operative to read boat speed and to compare the latest speed reading with the prior reading to determine whether boat speed is increasing, which control means is also operative to cause the trim drive means to move the drive unit in one direction so long as the adjustment results in increasing speed and to then cause the trim drive means to adjust the drive unit in the opposite direction so long as the adjustment results in increasing speed, which control means is also operative to hunt for optimum adjustment by adjusting the drive unit in both directions to maximize boat speed, and which control means is also operative to stop adjusting the drive unit when boat speed has been maximized.

The invention also provides a control for adjusting the trim of a marine drive unit, which control comprises a drive unit driven by an engine and adapted to be adjustably mounted on the boat for movement in and out to adjust the thrust angle relative to the boat, trim drive means for adjusting the drive unit relative to the boat to adjust the trim of the boat, boat speed responsive means providing output signals indicative of boat speed, and a microprocessor connected to receive the signals and operative to determine boat speed at intervals and to control the trim drive means, which microprocessor is programmed to hunt for optimum speed for the prevailing throttle setting by controlling the drive means to repeatedly move the drive unit in one direction in increments so long as each such movement results in a speed increase and to then move the drive unit in the opposite direction in increments so long as each such increment results in a speed increase, which microprocessor terminates operation of the drive means after hunting through a plurality of sequences of movement in one direction and in the opposite direction.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DETAILED DESCRIPTION OF THE DRAWINGS

Figure 1:
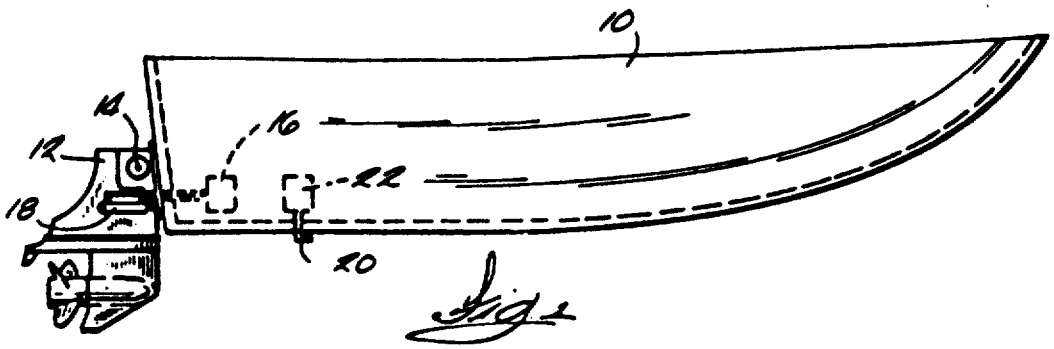
FIG. 1 is a schematic representation of a boat having a drive unit, a trim motor and a pitot tube for speed sending.

FIG. 1 shows a boat 10 provided with a stern drive unit 12 which is designed to pivot about an axis 14 to bring the drive unit inwardly or push it outwardly from the boat to change the thrust angle of the propeller force between an upwardly inclined angle and a downwardly inclined angle. Thus, when the drive unit is moved out, the thrust angle becomes downwardly inclined and tends to lift the bow. All other things being equal, that would tend to lift the bow and would offset a lot of weight forward in the boat. On the other hand, when the drive unit is moved inwardly, the thrust angle is inclined upwardly and tends to put the bow down. This invention concerns movement of the drive unit between these two positions.

The boat is provided with a reversible hydraulic motor 16, the output of which actuates the hydraulic cylinder 18 to move the drive unit in or out. Speed of the boat is sensed by a pitot tube 20 and the pressure therefrom is transmitted to the pressure transducer 22 which puts out an analog signal to the analog-to-digital converter 24. The digital output of the A/D converter 24 is input to the microprocessor 26.

As indicated above, this control is predicated on the concept that the optimum trim angle will result in optimum speed of the boat through the water. This approach would take into account the current throttle setting simply by maximizing the speed for that throttle setting. This is a substantial simplification over the art.

Figure 2:
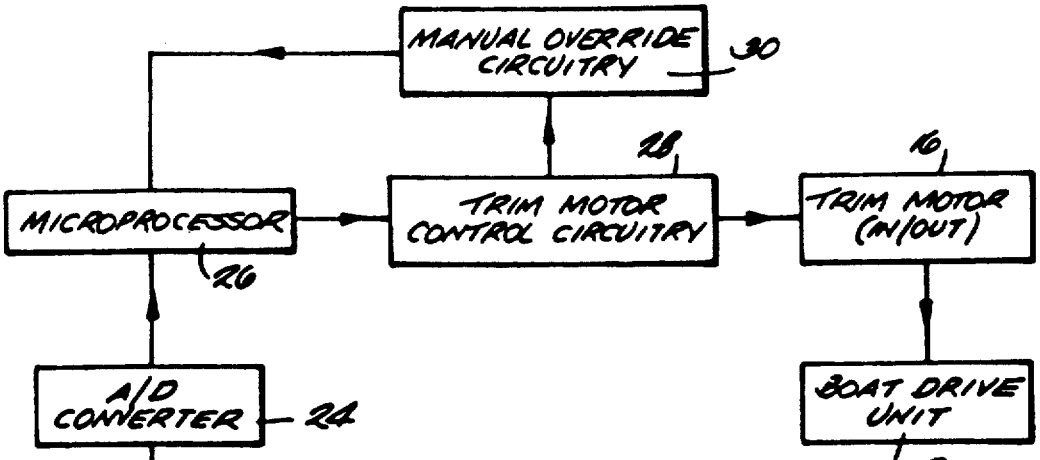
FIG. 2 is a diagramatic layout of the control system.

As indicated in FIG. 2, control means in the form of a microprocessor 26, an integrated circuit chip, receives a digital signal indicative of boat speed. The microprocessor 26 outputs a control signal to the trim motor control circuitry 28 which, in turn, commands the trim motor 16 to move the drive unit 12 in or out.

As shown in FIG. 2, the system can be provided with a manual override circuit 30 which would output a signal to the microprocessor 26 to de-activate the microprocessor control system. This gives the operator an opportunity to impose his wishes rather than accepting the automatic control. The trim motor control circuit then remains de-activated unit the circuit is activated by the operator.

The system would normally be provided with a manually operated switch on the dash or some remote location. This switch (not shown) is actuated to input a signal at 31 to the process step 32 (in FIG. 3) which will activate the present control and return the counter 34 to zero. At this point, the logic proceeds to the decision stage 36 where it is determined whether or not the boat speed is constant. If it has not become constant in response to the then prevailing throttle setting, the logic exits the decision box at 38 and returns to the input of the decision stage and is in an endless loop until the speed stabilizes. When the speed has stabilized, the logic proceeds from the decision stage 38 to processing box 40 where the trim motor 16 is actuated to move the drive unit OUT for X seconds. Then the logic proceeds to processing box 42 which is programmed to provide a delay of Y seconds for the boat to respond to the change in the trim angle of the drive unit. After the delay of Y seconds, the logic proceeds to decision box 44 which determines whether the boat speed is greater than the prior boat speed reading. If it is greater, the logic exits at 46 to return to the input of processing box 40 and the drive unit will be moved OUT again for X seconds, followed by a delay of Y seconds, and then returned to the decision box 44 where it is again determined whether or not the speed has increased. If if has, it will continue to go through the trim OUT procedure until finally at decision box 44 is determined that the speed has not increased. Then the logic exits at 48 to go to the process box 50 which increments the counter by one. Now the counter has gone from a count of zero to a count of one. The logic then exits to decision box 52 which determines whether or not the count has reached four. If it has gone to four (in our present hypothetical it obviously has not) the logic proceeds from the yes exit to the process box 54 where the control system is deactivated and the logic returns to process box 32 awaiting a reactivation signal input at 31.

Figure 3:
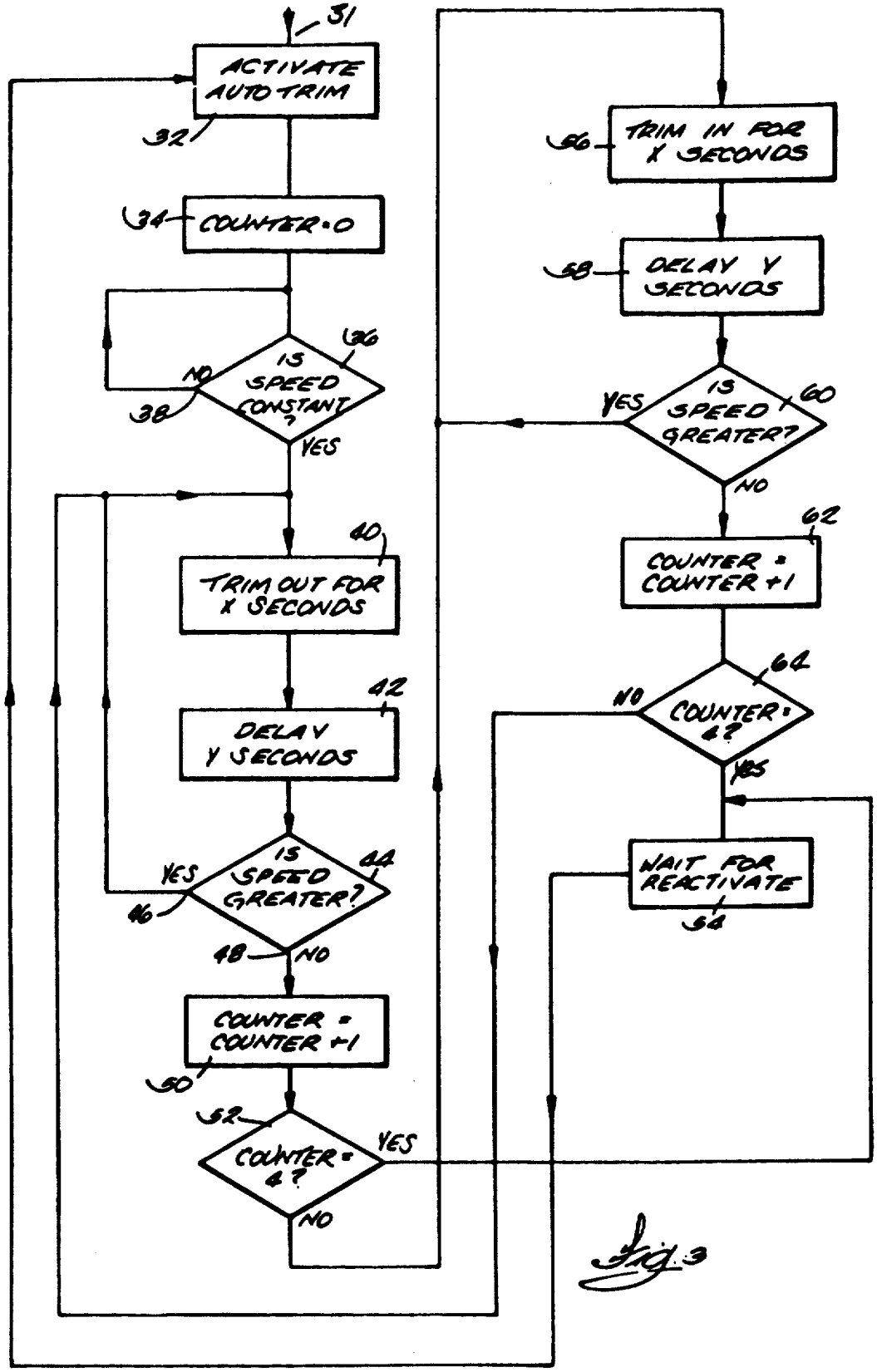
FIG. 3 is a simplified logic flow chart showing an algorithm which can be programmed into the microprocessor.

Returning now to the analysis of the algorithm in FIG. 3, if at the decision box 52 it is determined the count is not four, then the logic exits to the processing box 56 which commands the trim motor to move the drive unit IN for X seconds. The logic then proceeds to processing box 58 which imposes a delay of Y seconds for the boat to respond to the change in trim angle. Then the logic proceeds to decision box 60 where it is determined whether the boat speed is greater. If it is, the logic exits to return to decision box 56 to trim the unit IN for X seconds again, then waits for Y seconds and determines again if the speed has increased. If it has not increased, the logic proceeds to processing box 62 which will increment the counter by one. Then at decision box 64 it is determined whether or not the count has reached four. In our example to this point, we have incremented the count from zero to one to two and, therefore, the answer would be "no". Therefore, the logic would exit on the "no" branch and return to process box 40 which now trims the unit OUT.

At this point it should be noted the control initially trimmed the unit OUT, then IN, and is now again calling for the trim to move the unit OUT. Thus, the control is hunting. Now the control proceeds again through the trimming OUT adjustment and finally increments the counter by one again at 50 and proceeds to the decision box 52 which determines whether or not the count has reached four. The answer is "no" (it is at three) and, therefore, the logic proceeds through the drill of trimming the drive unit IN again seeking after each actuation of the drive unit to determine whether the change in trim resulted in an increase in boat speed. Finally, the logic exits to the process box 62 where the count is incremented by one and at decision box 64 it is determined that the count has now reached four. Therefore the logic exits to processing box 54 where the control system is deactivated and the logic returns to the start 32 to await a new "activate" signal.

Other logic systems may be utilized with a control of this type. The present arrangement shows a basic concept involved where, after the operator has set the throttle, the control gives time for the boat speed to settle down and then proceeds through the drill of moving the drive unit out-then-in and out-then-in while hunting for the optimum or near optimum condition, and the shutting down. More or fewer passes through the hunting logic could be provided by seeking a higher or lower count *Z* instead of 4 as in the example. In some instances, however, it may be satisfactory to simply keep making the change in one direction until the incremental change does not increase speed. If the failure to increase speed is actually a decrease in speed the control could go back to the prior setting of the trim angle.

In other embodiments, the installation could include a trim-out switch and/or a trim-in switch, each separately operable by an operator. The circuit would operate to trim in, or to trim out, which ever switch was activated by the operator, until maximum speed was achieved, i.e., until no further increase in speed was sensed, and would then deactivate until again manually energized by an operator.

Various features of the invention are set forth in the following claims.

We claim:

[1. Apparatus for trimming a drive unit on a boat, said apparatus comprising means for sensing an increase in boat speed, means for changing the trim of the drive unit, and control means connected to said sensing means and to said trim changing means for changing the trim of the drive unit until said sensing means senses the absence of boat speed increase.]

[2. Apparatus according to claim 1 in which said control means causes operation of said trim changing means in increments in both directions while seeking increased boat speed.]

[3. Apparatus according to claim 1 in which said control means delays operation of said trim changing means after activation until boat speed has stabilized.]

[4. Apparatus according to claim 1 in which said control means causes operation of said trim changing means in increments and delays determining the effect of the change on boat speed for a period of time following each such operation.]

5. A control for adjusting the trim of a marine drive unit, said control comprising a drive unit adapted to be adjustably mounted on a boat for adjustment of the drive unit thrust angle relative to the boat, trim drive means for adjusting said drive unit relative to the boat, boat speed responsive means providing an output signal indicative of boat speed, control means operative to control said trim drive means and connected to receive said output signal, said control means being operative to read boat speed and to compare the latest speed reading with the prior reading to determine whether boat speed is increasing, said control means being operative to cause said trim drive means to move said drive unit in one direction so long as the adjustment results in increasing speed and to then cause said trim drive means to adjust said drive unit in the opposite direction so long as the adjustment results in increasing speed, said control means being operative to hunt for optimum adjustment by adjusting said drive unit in both directions to maximize boat speed, said control means being operative to stop adjusting said drive unit when boat speed has been maximized.

6. A control according to claim 5 and further including means to activate said control means, said control means being operative to delay hunting for maximum boat speed until boat speed is constant following activation of said control means.

7. A control according to claim 5 in which there is a time delay following each adjustment of said drive unit before present boat speed is determined for comparison with the prior speed reading.

8. A control for adjusting the trim of a marine drive unit, said control comprising a drive unit driven by an engine and adapted to be adjustably mounted on the boat for movement in and out to adjust the thrust angle relative to the boat, trim drive means for adjusting said drive unit relative to the boat to adjust the trim of the boat, boat speed responsive means providing output signals indicative of boat speed, a microprocessor connected to receive said signals and operative to determine boat speed at intervals and to control said trim drive means, said microprocessor being programmed to hunt for optimum speed for the prevailing throttle setting by controlling said drive means to repeatedly move said drive unit in one direction in increments so long as each such movement results in a speed increase and to then move said drive unit in the opposite direction in increments so long as each such increment results in a speed increase, said microprocessor terminating operation of said drive means after hunting through a plurality of sequences of movement in one direction and in the opposite direction.

9. Apparatus for trimming a drive unit on a boat, said apparatus comprising means for sensing the speed of the boat, means for changing the trim of the drive unit, activating means, and control means operably connected to said speed sensing means and operable in response to activation by said activating means to cause operation of said trim changing means to seek increased boat speed by monitoring the effect on boat speed caused by changes in the trim of the drive unit.

*10. A control according to claim 5 wherein said control means causes said trim drive means to adjust said drive unit in said opposite direction even if boat speed remains constant after operation of said trim drive means to move said drive unit in said one direction.*

*11. A control according to claim 5 wherein said control means causes operation of said trim drive means to change the trim for X seconds, stops operation of said trim drive means, delays for Y seconds, and then determines whether boat speed is greater than before operation of said trim drive means.*

*12. A control according to claim 5 wherein said control means changes the direction of operation of said trim drive means Z times and then waits for operator reactivation, regardless of changes in boat speed, before again causing operation of said trim drive means.*

*13. A control according to claim 5 wherein said control means is operative, after actuation thereof, to prevent operation of said trim drive means until boat speed is constant.*

*14. A control according to claim 8 wherein said microprocessor causes operation of said trim drive means to change the trim in one direction until sensing the absence of boat speed increase and then causes operation of said trim drive means to change the trim in the opposite direction even if boat speed remains constant after operation of said trim drive means to change the trim in said one direction.*

*15. A control according to claim 8 wherein said microprocessor causes operation of said trim drive means to change the trim for X seconds, stops operation of said trim drive means, delays for Y seconds, and then determines whether boat speed is greater than before operation of said trim drive means.*

*16. A control according to claim 8 wherein said microprocessor causes operation of said trim drive means in one direction, then changes the direction of operation of said trim drive means Z times, and then waits for operator reactivation, regardless of changes in boat speed, before again causing operation of said trim drive means.*

*17. A control according to claim 8 wherein said microprocessor is operative, after actuation thereof, to prevent operation to said trim drive means until boat speed is constant.*

*18. Apparatus according to claim 9 wherein said control means causes operation of said trim changing means to change the trim in one direction until said sensing means senses the absence of boat speed increase and then causes operation of said trim changing means to change the trim in the opposite direction even if boat speed remains constant after operation of said trim changing means to change the trim in said one direction.*

*19. Apparatus according to claim 9 wherein said control means causes operation of said trim changing means to change the trim for X seconds, stops operation of said trim changing means, delays for Y seconds, and then determines whether boat speed is greater than before operation of said trim changing means.*

*20. Apparatus according to claim 9 wherein said control means causes operation of said trim changing means in one direction, then changes the direction of operation of said trim changing means Z times, and then waits for operator reactivation, regardless of changes in boat speed, before again causing operation of said trim changing means.*

*21. Apparatus according to claim 9 wherein said control means is operative, after actuation thereof, to prevent operation of said trim changing means until boat speed is constant.*

* * * * *